(12) United States Patent  
Anderson (10) Patent No.: US 9,067,626 B1
(45) Date of Patent: Jun. 30, 2015

(54) VEHICLE WITH SEGMENTED REAR HATCH (71) Applicant: Ford Global Technologies, LLC, Dearborn, MI (US)

(72) Inventor: Ronald Anderson, Newport Beach, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/217,786

(22) Filed: Mar. 18, 2014

(51) Int. Cl.
*B62D 25/00* (2006.01)
*B62D 25/12* (2006.01)

(52) U.S. Cl.
CPC ..................................... *B62D 25/12* (2013.01)

(58) Field of Classification Search
CPC ... B62D 25/12; B62D 25/10; E05Y 2900/548
USPC .......................................... 296/146.8, 76, 56
See application file for complete search history.

(56) References Cited

U.S. PATENT DOCUMENTS

| 4,688,844 | A  | * | 8/1987  | Hirose et al. .................... 296/76 |
| 6,174,015 | B1 | * | 1/2001  | Shave ............................. 296/56 |
| 6,471,284 | B2 | * | 10/2002 | Landmesser ............... 296/146.8 |
| 8,573,676 | B2 | * | 11/2013 | Chinta ............................ 296/76 |

FOREIGN PATENT DOCUMENTS

| CN | 101932466 A  | 12/2010 |
| DE | 10222987 A1  | 12/2003 |
| FR | 2782974 A1   | 3/2000  |
| WO | 2008074266 A1 | 6/2008 |

* cited by examiner

*Primary Examiner* — Joseph D Pape
(74) *Attorney, Agent, or Firm* — Raymond Coppiellie; Price Heneveld LLP (57) ABSTRACT

A vehicle includes a rear hatch opening and a segmented hatch that is moveably connected to the vehicle structure. A lid is moveably connected to the upper hatch for movement between open and closed positions relative to the upper hatch. A first pair of lockable gas struts prevent opening of the upper hatch when locked. A second pair of lockable gas struts prevent opening of the lid relative to the upper hatch when locked. The upper hatch and the lid include overlapping portions that define spaces therebetween when the lid is in a closed position relative to the upper hatch. The second pair of lockable gas struts are disposed in the spaces when the lid is in a closed position relative to the upper hatch.

20 Claims, 8 Drawing Sheets

VEHICLE WITH SEGMENTED REAR HATCH

FIELD OF THE INVENTION

The present invention generally relates to motor vehicles, and more particularly, to a vehicle including a segmented or sectional rear hatch or tailgate having a lid that is moveably connected to an upper hatch utilizing a compact linkage and lift assembly.

BACKGROUND OF THE INVENTION

Motor vehicles may include a segmented or sectional rear hatch including an upper hatch and a lid that is moveably connected to the upper hatch. The hatch and lid can be opened together, or the lid can be opened by itself. Known arrangements may include linkages that are relatively large and complicated, and the linkages may extend into the vehicle interior, thereby reducing the useable space within the vehicle.

SUMMARY OF THE INVENTION

One aspect of the present invention is a segmented hatch for vehicles. The segmented hatch includes an upper hatch defining an upper edge portion and a pair of recessed regions. A first connector moveably connects the upper portion of the segmented hatch to a motor vehicle adjacent a rear portion of a roof of the motor vehicle whereby the upper hatch can be moved relative to the vehicle to an open position. A lid is moveably connected to the upper hatch such that the lid can be moved relative to the upper hatch between open and closed positions. The lid includes forward portions that extend over the recessed regions of the upper hatch when the lid is in a closed position to define a pair of cavities. A lockable first extensible strut such as a locking gas spring generates a force to assist opening the upper hatch when the first extensible strut is unlocked. A pair of lockable second extensible struts operably interconnect the lid and the upper hatch and generate forces to assist opening the lid relative to the upper hatch when the second extensible struts are unlocked. The second extensible struts are disposed in the cavities when the lid is closed relative to the upper hatch. A first release selectively unlocks the first extensible strut to thereby permit movement of the upper hatch from a closed position to an open position, and a second release selectively unlocks the second extensible struts to thereby permit the lid to move from a closed position to an open position relative to the upper hatch.

Another aspect of the present invention is a vehicle including a vehicle structure defining a rear hatch opening. The vehicle includes a segmented hatch having an upper hatch that is moveably connected to the vehicle structure for movement between open and closed positions, and a lid that is moveably connected to the upper hatch for movement between open and closed positions relative to the upper hatch. At least a first lockable gas strut operably interconnects the upper hatch and the vehicle structure. The first lockable gas strut generates a biasing force that assists opening the upper hatch when the strut is unlocked, and wherein the one gas strut prevents opening of the upper hatch when locked. At least a second lockable gas strut operably interconnects the lid and the upper hatch and generates a biasing force that assists opening the lid relative to the upper hatch when the gas strut is unlocked. The second lockable gas strut prevents opening of the lid relative to the upper hatch when locked. The upper hatch and the lid include overlapping portions that define spaces therebetween when the lid is in a closed position relative to the upper hatch. The second lockable gas strut is disposed in one of the spaces when the lid is in a closed position relative to the upper hatch.

Another aspect of the present invention is a vehicle including a body having a rear opening. An upper hatch is moveably connected to the body, and includes a pair of inner extensions. A lid is moveably connected to the upper hatch, and includes a pair of outer extensions extending over the inner extensions of the upper hatch when the lid is closed relative to the upper hatch. A four bar linkage and a locking gas spring is disposed between each of the inner and outer extensions.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
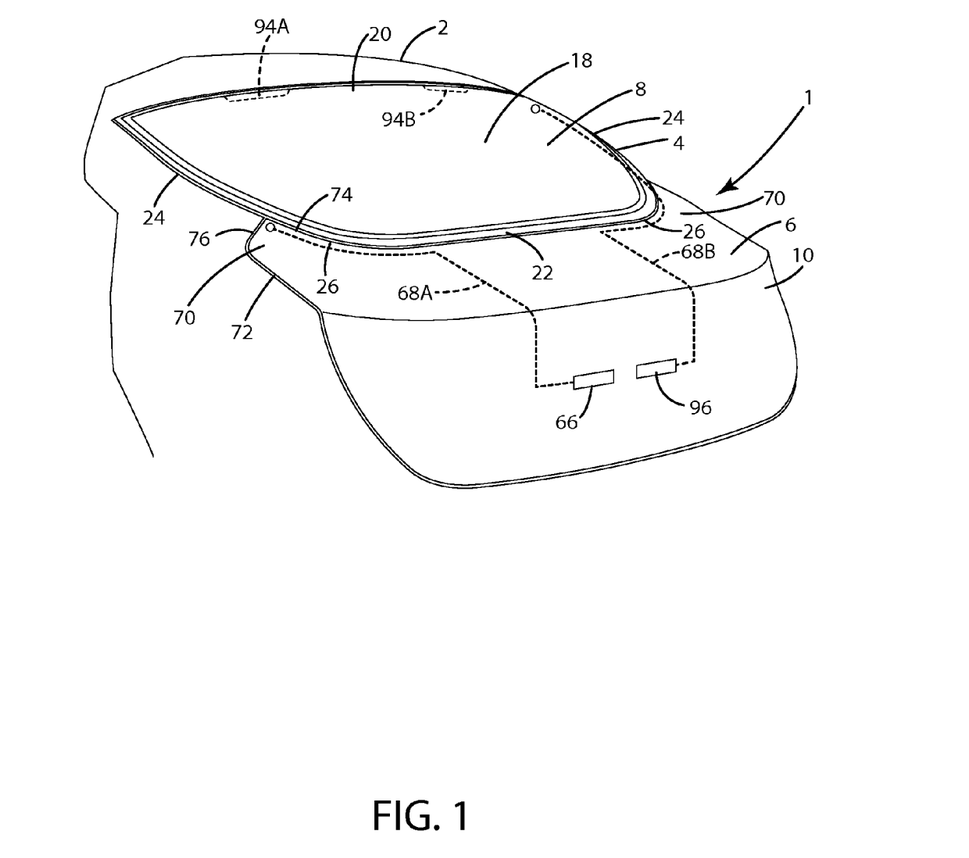
FIG. 1 is a partially fragmentary isometric view of a vehicle having a segmented hatch according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 10:
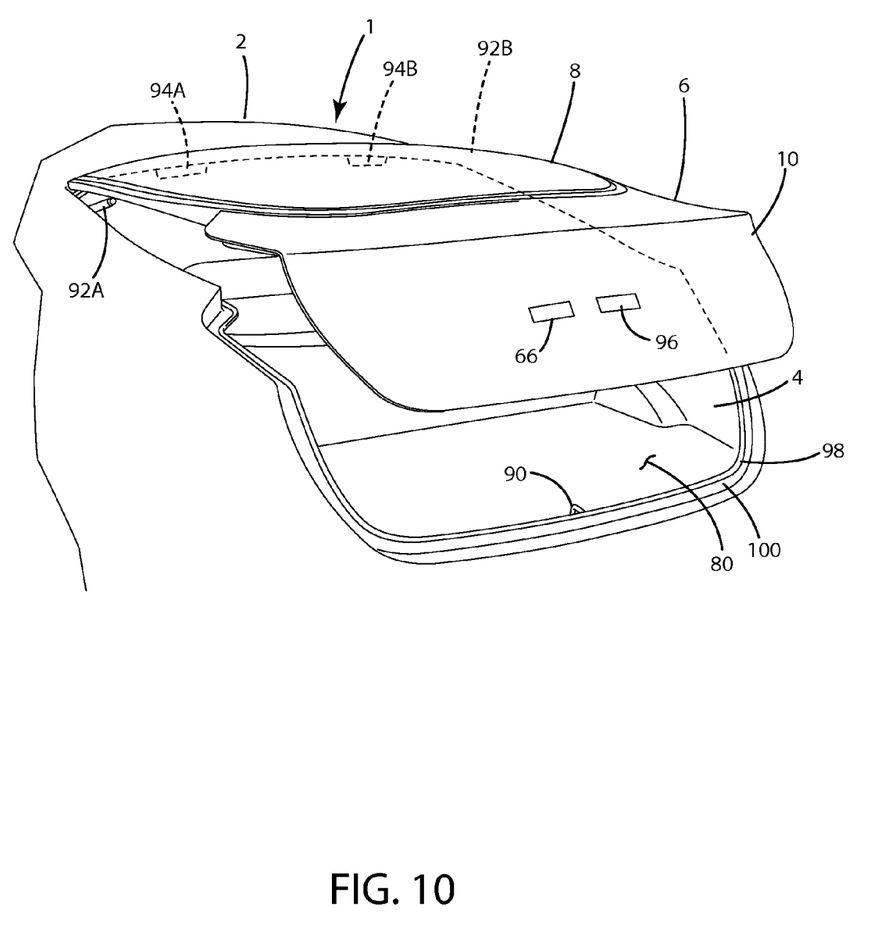
FIG. 10 is a fragmentary isometric view of a rear portion of a vehicle showing the segmented hatch in a partially opened position.

With reference to FIG. 1, a motor vehicle 1 includes a body 2 having a rear opening 4 (see also FIG. 10) that may be closed off by a segmented hatch 6. As discussed in more detail below, the segmented hatch 6 includes an upper hatch portion 8 and a lid 10, wherein upper hatch portion 8 is moveably connected to the body structure 2 by upper hinges 94A, 94B and upper locking gas springs 92A, 92B (see also FIGS. 10 and 11) such that the segmented hatch 6 can be moved from a closed position (FIG. 1) to an open position (FIG. 10). Lid 10 of segmented hatch 6 is moveably connected to the upper hatch portion 8 such that the lid 10 can be moved from a closed position (FIG. 1) to an open position (FIG. 7) by unlocking gas springs 60A and 60B (FIG. 7) while gas springs 94A and 94B are locked. As discussed in more detail below, a latch 88 is released when lid 10 is opened (FIG. 7) and when the segmented hatch 6 is opened (FIG. 10).

Figure 2A:
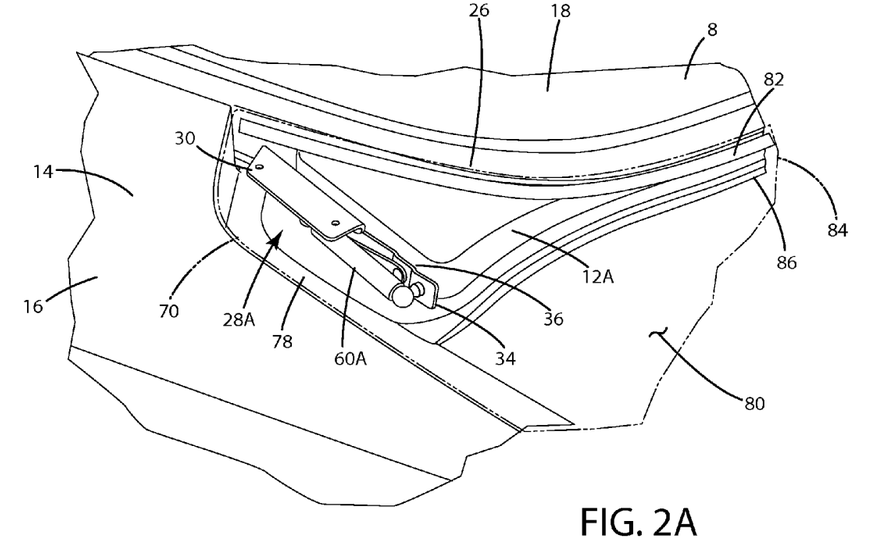
FIG. 2A is a fragmentary enlarged view of a portion of the vehicle of FIG. 1 with the lid in phantom lines to show the linkage assembly and gas spring in the closed position.
Figure 3:
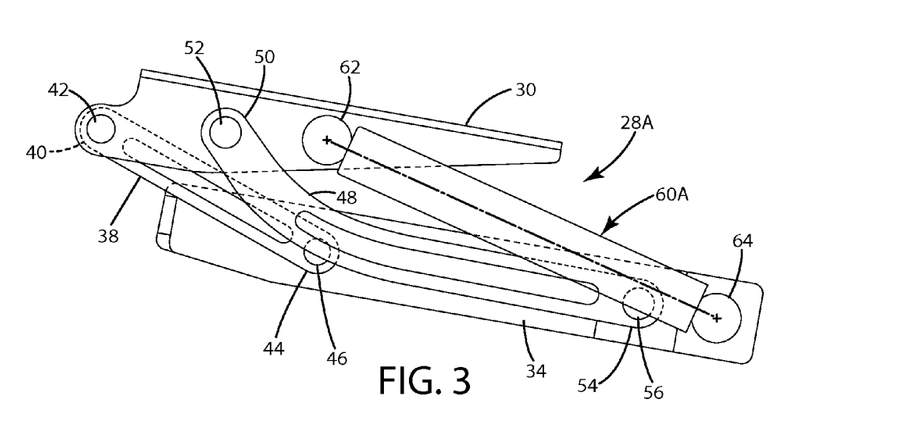
FIG. 3 is a side elevational view of the linkage assembly and gas spring of FIG. 2.
Figure 7:
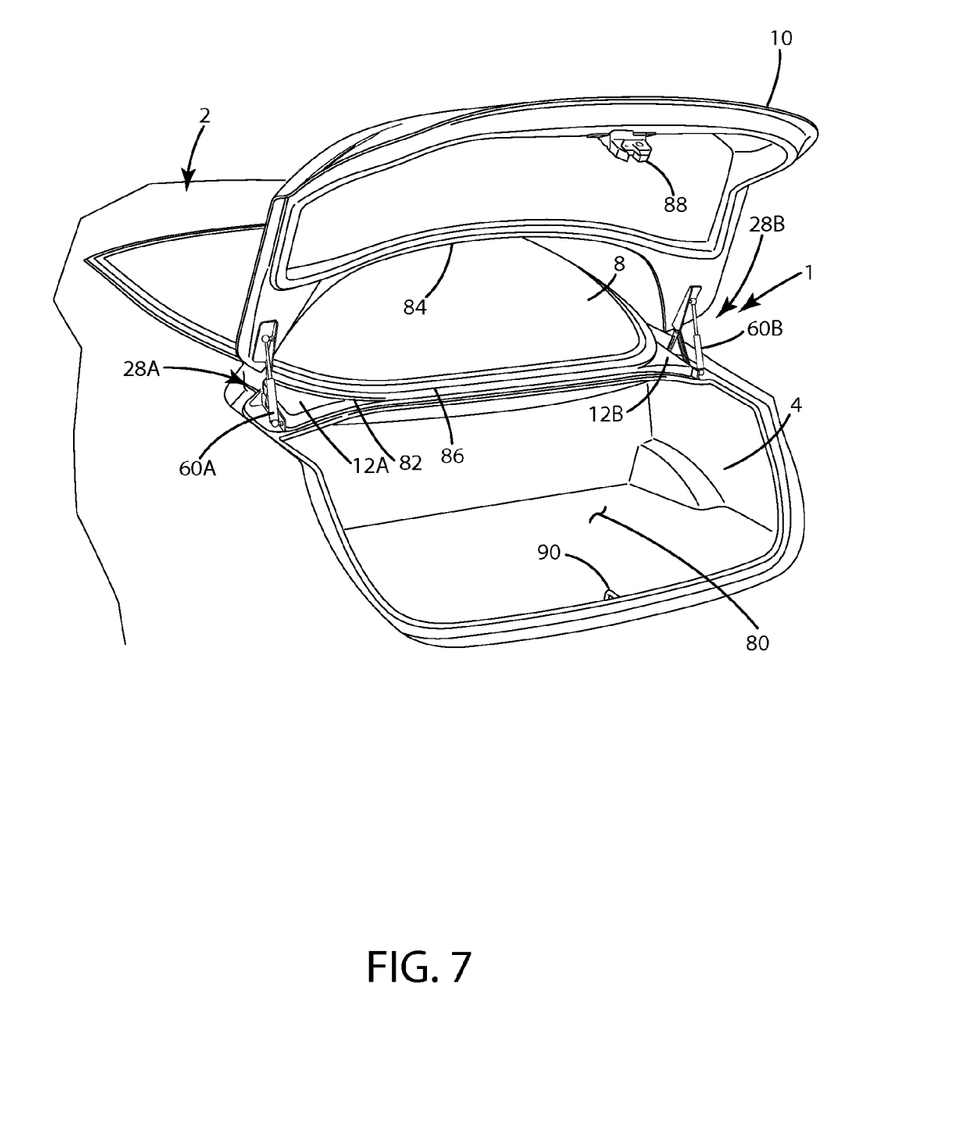
FIG. 7 is a fragmentary isometric view of a vehicle showing the lid in a fully open position.

With further reference to FIGS. 2A, 3, and 7, upper hatch 8 includes a pair of outwardly extending portions 12 (see also FIG. 7) that are generally recessed relative to a surface 14 of a vehicle body panel 16 and a rear window 18 of upper hatch 8. Referring again to FIG. 1, the rear window 18 generally includes a front edge 20, a rear edge 22, and side edges 24 that extend between the front and rear edges 20, 22 respectively to define rear corner portions 26. The extensions 12 (FIG. 2A) generally extend outwardly from adjacent the rear corner portions 26 of rear window 18. A pair of linkage assemblies 28A and 28B and locking gas springs 60A and 60B (FIG. 7) are mounted to the extensions 12A and 12B of upper hatch 8 and moveably interconnect the lid 10 to upper hatch 8. The linkage assemblies 28A and 28B and locking gas springs 60A and 60B are mirror images of one another, such that only linkage assembly 28A is described in detail.

Figure 6:
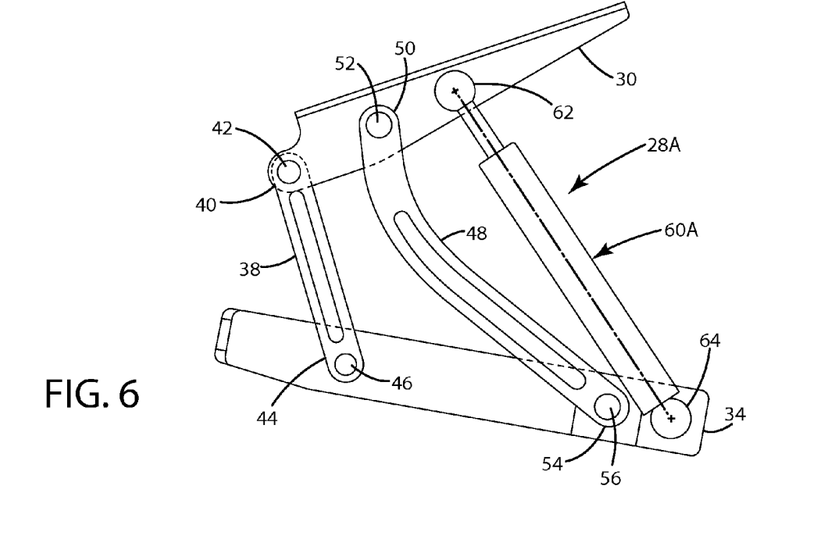
FIG. 6 shows the linkage and gas spring in a partially opened position.
Figures 8, 9:
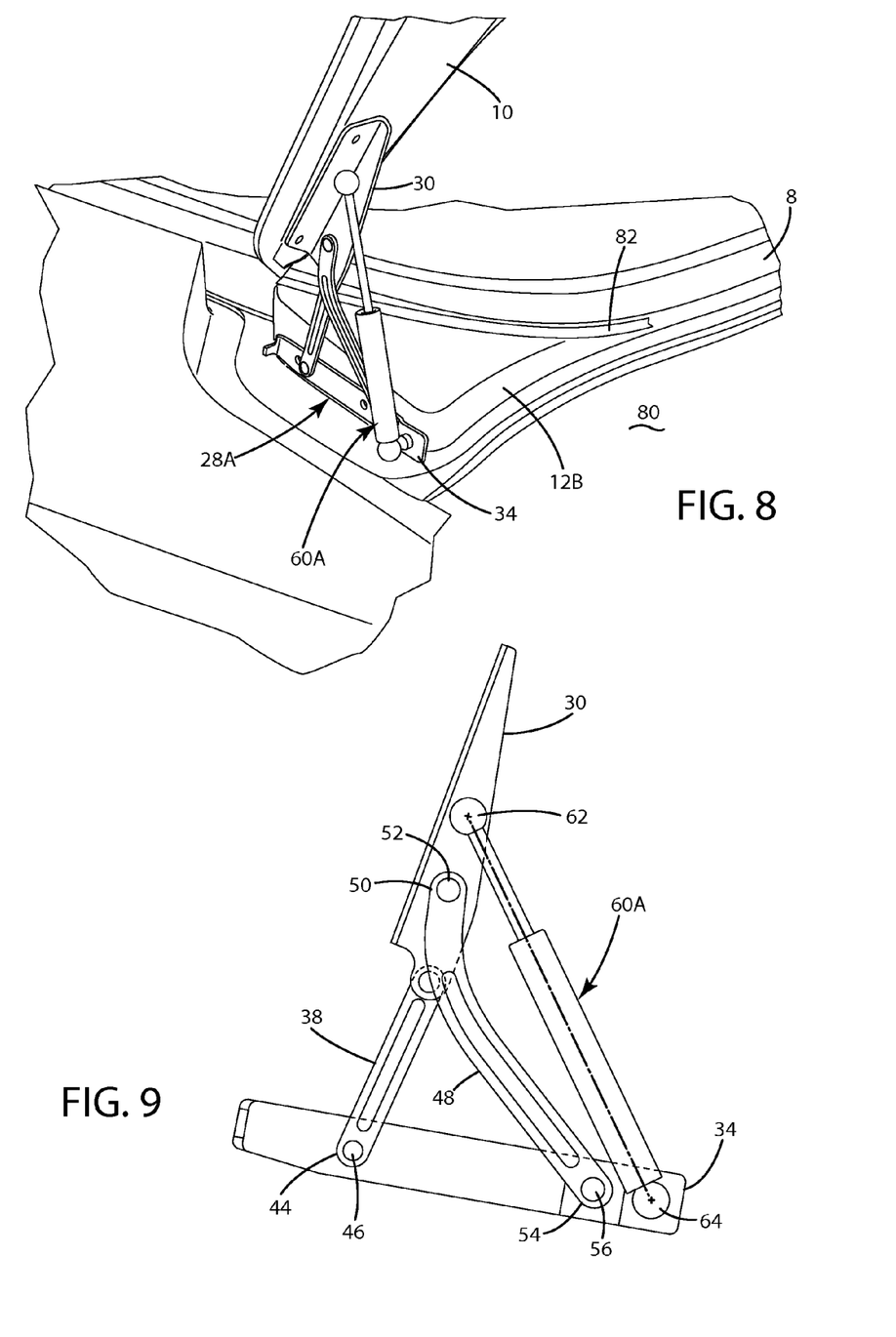
FIG. 8 is an enlarged, partially fragmentary view showing a portion of the vehicle of FIG. 7.
FIG. 9 is a view of the linkage and gas spring assembly of FIG. 8.

Referring again to FIGS. 2A and 3, linkage assembly 28A includes an upper bracket 30 that attaches to a lower surface 32 (FIG. 4) of lid 10, and a lower bracket 34 that connects to a mounting surface 36 of extension 12 of upper hatch 8. A first link 38 includes a first or upper end 40 that is pivotally connected to upper bracket 30 by a pin or pivot 42, and a second or lower end 44 that is pivotally connected to lower bracket 34 by a pin or pivot 46. A second link 48 includes a first or upper end 50 that is pivotally connected to upper bracket 30 at pin or pivot 52, and a lower or second end 54 that is pivotally connected to lower bracket 34 by a pin or pivot 56. The brackets 30 and 34 and links 38 and 48 together define a four-bar linkage that moveably interconnects the lid 10 to the upper hatch 8 to provide for controlled movement of the lid 10 relative to upper hatch 8 as shown in FIGS. 3, 6, and 9. Various types of moveable connecting arrangements may be utilized to moveably interconnect lid 10 and upper hatch 8 as may be required for a particular application.

A locking gas spring 60A (FIG. 3) includes an upper end 62 that is pivotally connected to upper bracket 30 and a lower end 64 that is pivotally connected to the lower bracket 34. As shown in FIGS. 3, 6, and 9, the locking gas spring 60A extends or telescopes as the lid 10 is moved to an open position relative to upper hatch 8. The locking gas springs 60A and 60B may comprise commercially available gas struts having locking mechanisms that prevent extension of the locking gas springs 60A and 60B when the locking gas springs 60A and 60B are in a locked configuration. The locking mechanism may comprise powered actuators that can be remotely actuated utilizing an electrical switch 66 or fob (not shown).

When the lid 10 is in a closed position relative to upper hatch 8 (FIGS. 1 and 10) and the locking gas springs 60A and 60B are in a locked configuration the lid 10 is rigidly interconnected with upper hatch 8 and moves therewith as shown in FIG. 10. The locking gas springs 60A and 60B may be operably connected to a user input feature such as first button 66 on lid 10 (FIG. 1). The button 66 may comprise a moveable member that is operably interconnected to the locking gas springs 60A and 60B by an elongated cable 68A or other mechanical member (FIG. 1). Alternatively, the button 66 may comprise an electrical switch that operates a powered actuator (not shown) that locks and unlocks the gas springs 60A and 60B. Actuation of button 66 releases latch 88 and locking gas springs 60A and 60B, but causes upper gas springs 92A and 92B to remain locked such that upper hatch portion 8 cannot open.

Figure 2B:
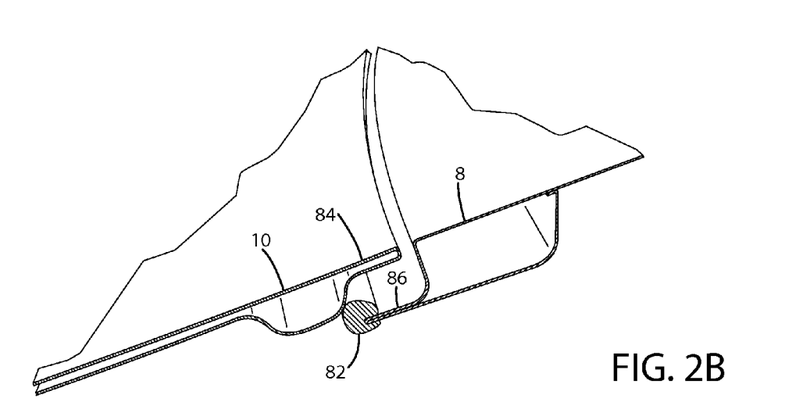
FIG. 2B is a fragmentary view showing a resilient seal that forms a watertight seal.

Referring again to FIG. 1, lid 10 includes a pair of front corner portions or extensions 70 having an outer edge 72, an inner edge 74, and a forward edge 76. The extensions 70 of lid 10 extend over the extensions 12 of upper hatch 8 when lid 10 is in a closed position relative to upper hatch 8 (FIG. 2A) to define a pair of cavities or spaces 78 between the extensions 70 of lid 10 and the extensions 12 of upper hatch 8. The linkage assemblies 28A and 28B and locking gas springs 60A and 60B are disposed in the cavities or spaces 78 when lid 10 is closed. Thus, the linkage assemblies 28A and 28B do not project into the interior space 80 of vehicle 1. Also, when lid 10 is closed, a forward edge 84 (FIG. 2B) of lid 10 overlaps a rear edge portion 86 of upper hatch 8, and an elongated resilient seal member 82 provides a water tight seal between forward edge 84 of lid 10 and rear edge 86 of upper hatch 8. The linkage assemblies 28A and 28B and locking gas springs 60A, 60B may be positioned outside of the seal line formed by elongated flexible seal 82, such that the linkage assemblies 28A, 28B and locking gas springs 60A, 60B are in a "wet area." This provides a water tight seal to prevent entry of water into interior space 80 of vehicle 1, without requiring sealing of moving components such as linkage assemblies 28A, 28B.

Figure 4:
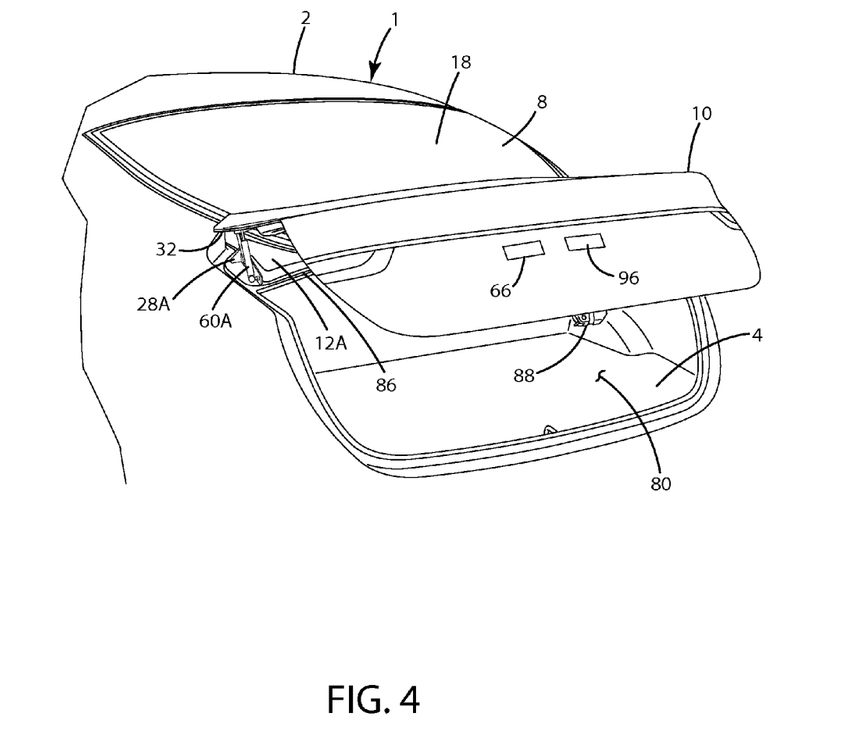
FIG. 4 is a fragmentary isometric view of a rear portion of a vehicle showing the lid in a partially opened position.
Figure 5:
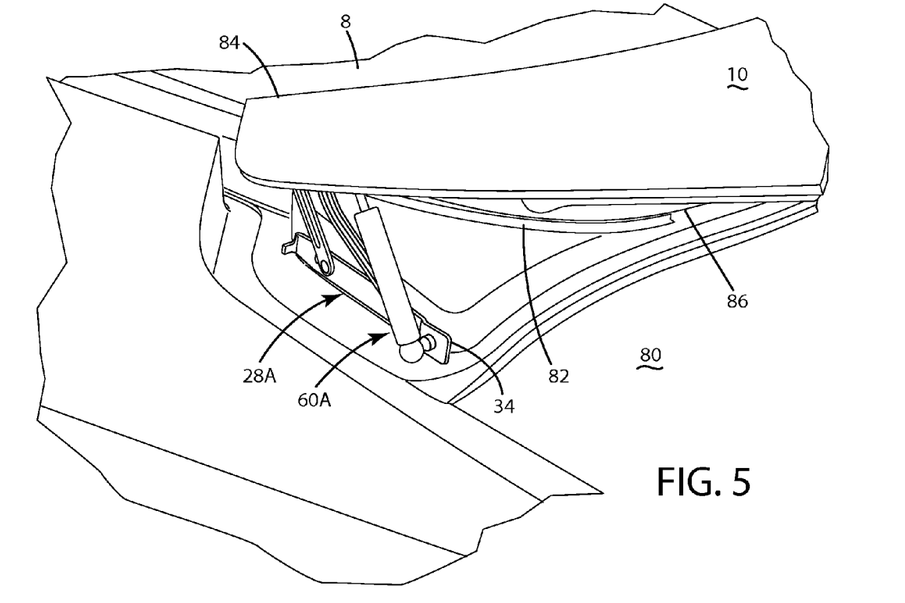
FIG. 5 is an enlarged fragmentary view of a portion of the lid of FIG. 4.

The lid 10 may be selectively retained in a closed position by a conventional latch 88 and striker 90 (FIGS. 4 and 7). Latch 88 may be operably connected to first button 66 by a mechanical cable, or the latch 88 may be powered to permit remote release. Opening lid 10 (by itself) may involve actuation of first button 66. This unlocks the locking gas springs 60A and 60B, while upper gas springs 92A and 92B remain locked to prevent movement about upper hinges 94A and 94B, and also unlatches the latch 88 to thereby permit movement of lid 10 from the closed position (FIG. 1) to the partially opened position of FIG. 4 and the fully opened position of FIG. 7.

Figure 11:
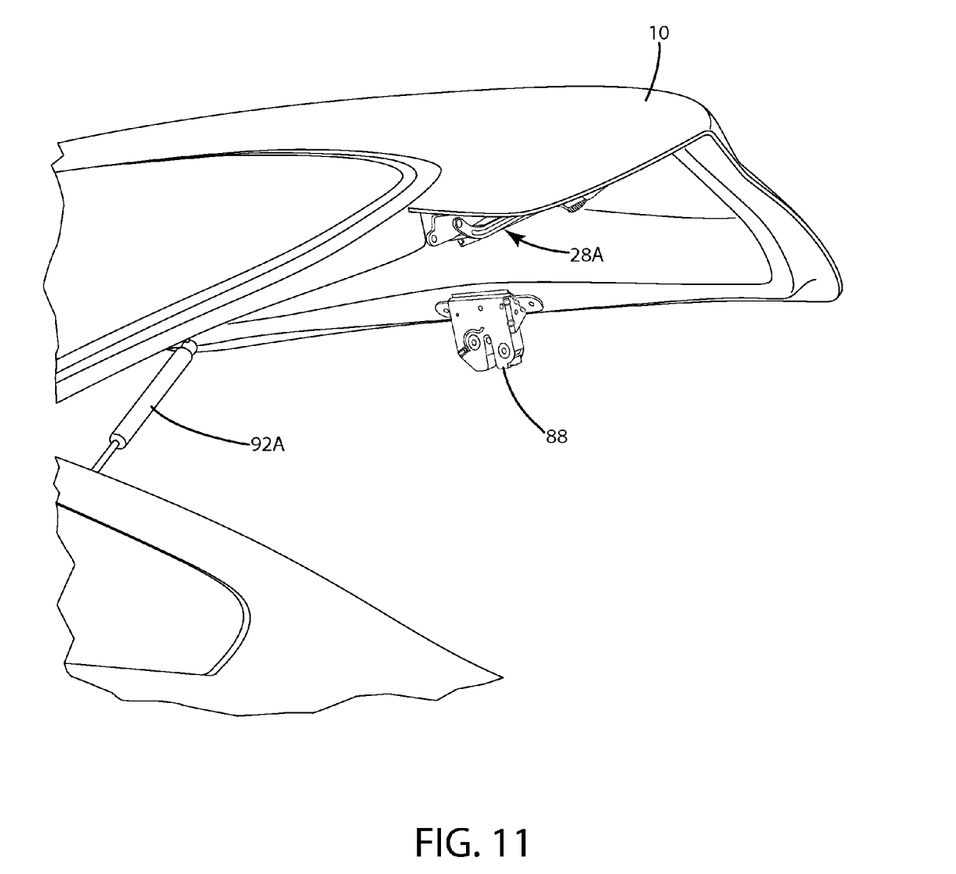
FIG. 11 is a partially fragmentary view of the vehicle of FIG. 10.

With further reference to FIGS. 10 and 11, the upper hatch 10 is moveably interconnected to the vehicle body structure to by a pair of linkage or pivot assemblies 94A and 94B. Linkage assemblies 94A and 94B may be substantially similar to existing connecting arrangements utilized in hatchback vehicles to provide movement of upper hatch 8 relative to body structure 2. For example, the pivot assemblies 94A and 94B may be substantially similar to the hinges of a FORD® ESCAPE® hatchback. Such pivoting connector arrangements are known to those skilled in the art, such that the linkage or pivot assemblies 94A and 94B are not described in detail herein. A pair of locking gas springs 92A and 92B operably interconnect upper hatch 8 with body structure 2 and provide a biasing force that assists in opening upper hatch 8. The locking gas springs 92A and 92B may be operably connected to a second button 96 whereby actuation of second button 96 causes the locking gas springs 92A and 92B to unlock while the gas springs 60A, 60B remain locked. Actuation of second button 96 may also release latch 88 to thereby permit segmented hatch 6 to pivot upwardly as a unit as shown in FIGS. 10 and 11. In general, actuation of second button 96 does not cause gas springs 60A, 60B to unlock, such that lid 10 is rigidly interconnected to upper hatch 8 to permit segmented hatch 6 to open as a single unit. An elongated seal 98 may extend around edge portion 100 of rear opening 4 to provide a water tight seal with the upper hatch 8 and lid 10.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

I claim:

1. A segmented hatch for vehicles, the hatch comprising:
an upper hatch defining an upper edge portion and a pair of recessed regions;
a first connector for movably connecting the upper portion to a motor vehicle adjacent a rear portion of a roof of a motor vehicle whereby the upper hatch can be moved from a closed position to an open position relative to a vehicle;
a lid movably connected to the upper hatch whereby the lid can be moved relative to the upper hatch between open and closed positions, the lid including forward portions that extend over the recessed regions to define a pair of cavities when the lid is in a closed position;
a lockable first extensible strut generating a force to assist opening of the upper hatch when the first extensible strut is unlocked;
a pair of lockable second extensible struts operably interconnecting the lid and the upper hatch and generating forces to assist opening of the lid relative to the upper hatch, wherein the second extensible struts are disposed in the cavities when the lid is closed relative to the upper hatch portion;
a first release configured to selectively unlock the first extensible strut to thereby permit movement of the upper hatch from a closed position to an open position; and
a second release configured to selectively unlock the second extensible struts to thereby permit the lid to move from a closed position to an open position relative to the upper hatch.

2. The segmented hatch of claim 1, wherein:
the lid is movably connected to the upper hatch by a pair of four bar linkage assemblies, each linkage assembly including first and second links having opposite ends thereof pivotably connected to the upper portion and to the lid.

3. The segmented hatch of claim 2, wherein:
the first and second links are disposed within the cavities adjacent the second extensible struts when the lid is closed relative to the upper hatch.

4. The segmented hatch of claim 3, wherein:
the first extensible strut and the second extensible struts comprise lockable gas springs.

5. The segmented hatch of claim 1, wherein:
the upper hatch includes a window defining an upper edge, a lower edge, and side edges extending between the upper and lower edges; and
the forward portions of the lid, include inner edges that extend along lower portions of the side edges of the window.

6. The segmented hatch of claim 5, wherein:
the forward portions of the lid include outer edges that are spaced apart from the inner edges, and forward edges that extend between the inner and outer edges such that the forward portions define horizontally spaced apart forwardly extending projections.

7. The segmented hatch of claim 6, wherein:
the lockable second extensible struts have first ends that are pivotably connected to the upper portion, and second ends that are pivotably connected to the forward portions of the lid.

8. The segmented hatch of claim 7, wherein:
the upper portion includes a rear edge, and the lid includes a forward edge that overlaps the rear edge of the upper portion; and including:
an elongated resilient seal disposed between the rear edge of the upper hatch and the forward edge of the lid to form a watertight seal when the lid is closed relative to the upper hatch, and wherein the lockable extensible struts are disposed outside the elongated resilient seal.

9. The segmented hatch of claim 8, wherein:
the window defines lower corners, and the upper hatch includes structures that extend outwardly away from the lower corners under the forwardly extending projections of the lid to define the recessed regions.

10. The segmented hatch of claim 1, wherein:
the first release comprises a first movable member disposed on an outside of the lid and a first elongated flexible member that mechanically connects the first movable member to the first extensible strut to provide mechanical unlocking of the first extensible strut upon movement of the first movable member.

11. The segmented hatch of claim 10, wherein:
the second release comprises a second movable member disposed on an outside of the lid and a second elongated flexible member that mechanically connects the second movable member to the second extensible strut to provide mechanical unlocking of the second extensible strut upon movement of the second movable member.

12. The segmented hatch of claim 1, wherein:
the first and second releases comprise powered actuators that selectively unlock the first and second locking extensible struts.

13. The segmented hatch of claim 1, wherein:
the lockable first extensible strut comprises a pair of lockable first extensible struts.

14. A vehicle, comprising:
a vehicle structure defining a rear hatch opening;
a segmented hatch having an upper hatch that is movably connected to the vehicle structure for movement between open and closed positions, and a lid that is movably connected to the upper hatch for movement between open and closed positions relative to the upper hatch;
a first pair of lockable gas struts operably interconnecting the upper hatch and the vehicle structure and generating a biasing force to assist opening the upper hatch when unlocked, and wherein the first pair of lockable gas struts prevent opening of the upper hatch when at least one of the first pair of lockable gas struts is locked;
a second pair of lockable gas struts operably interconnecting the lid and the upper hatch and generating a biasing force to assist opening the lid relative to the upper hatch when unlocked, and wherein the second pair of lockable gas struts prevent opening of the lid relative to the upper hatch when at least one of the second pair of lockable gas struts is locked; and wherein:
the upper hatch and the lid include overlapping portions that define spaces therebetween when the lid is in a closed position relative to the upper hatch, and wherein the second pair of lockable gas struts are disposed in the spaces when the lid is in a closed position relative to the upper hatch.

15. The vehicle of claim 14, including:
a release that selectively unlocks the first and second pairs of lockable gas struts.

16. The vehicle of claim 14, including:
a pair of four bar linkages movably interconnecting the lid to the upper hatch.

17. The vehicle of claim 16, wherein:
the four bar linkages are disposed in the spaces between the overlapping portions of the upper hatch and the lid when the lid is in a closed position relative to the upper hatch.

18. A vehicle, comprising:
a body having a rear opening:
an upper hatch movably connected to the body and including a pair of inner extensions;
a lid movably connected to the upper hatch and having a pair of outer extensions extending over the inner extensions when the lid is closed relative to the upper hatch; and
a four bar linkage and a locking gas spring disposed between each pair of inner and outer extensions.

19. The vehicle of claim 18, including:
an elongated flexible seal disposed between overlapping portions of the upper hatch and the lid to form a watertight seal when the lid is closed, wherein the four bar linkages and the locking gas springs are disposed outside the watertight seal.

20. The vehicle of claim 18, including:
a release member operably connected to the locking gas springs to selectively unlock the locking gas springs.

* * * * *